No. 664,029. Patented Dec. 18, 1900.
V. T. WEATHERS.
ACETYLENE GAS GENERATOR.
(Application filed July 18, 1900.)
(No Model.)
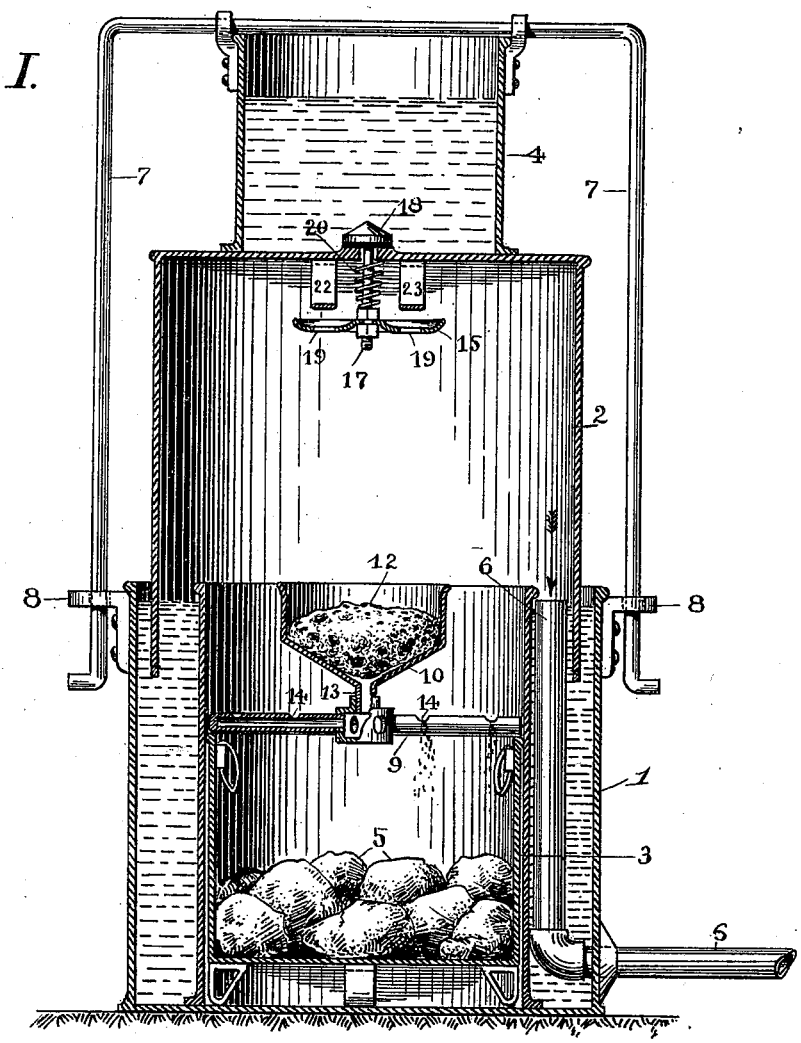
Fig. I.
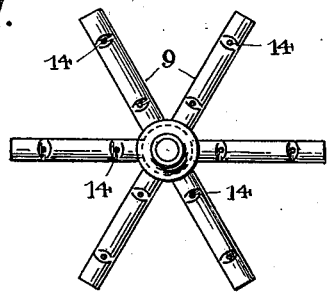
Fig. II.
Witnesses.
Inventor.

United States Patent Office.

VICTOR T. WEATHERS, OF IONE, CALIFORNIA, ASSIGNOR OF TWO-THIRDS TO DAVID McCALL, OF SAME PLACE.

ACETYLENE-GAS GENERATOR.

SPECIFICATION forming part of Letters Patent No. 664,029, dated December 18, 1900.

Application filed July 18, 1900. Serial No. 24,049. (No model.)

*To all whom it may concern:*

Be it known that I, VICTOR T. WEATHERS, a citizen of the United States of America, residing at Ione, county of Amador, and State of California, have invented certain new and useful Improvements in Acetylene-Generators; and I hereby declare the following to be a full, clear, and exact description of the same, reference being had to the accompanying drawings, forming a part of this specification.

My invention relates to acetylene-gas generators and to certain improvements therein, and especially to a means of accurately regulating the amount of water supplied to the carbid and consequent control of the amount of gas evolved therefrom.

My improvement consists in the introduction into the water-supplying conduit or passage of a compressible and absorbent substance, preferably a sponge, that will upon the relief of pressure therefrom arrest, absorb, and draw back the flowing water, instantly stopping the supply; and it also consists in other features of a constructive nature, hereinafter explained, and illustrated by drawings accompanying and forming a part of this specification.

The objects of my invention are to attain complete control of the water-supply, and consequently of the rate at which gas is generated, and to provide a simple and inexpensive apparatus that does not need adjustment or skilled attention of any kind, also one the dimensions of which will be small in proportion to the duty performed.

Referring to the drawings, Figure I is a central vertical section through an acetylene-gas-generating apparatus constructed according to my invention, and Fig. II a top view of a water-distributing device placed over the carbid-containing vessel.

In operating devices for generating acetylene gas a principal impediment is to so regulate the water-supply that the gas generated will correspond to the amount consumed, and thus dispense with large storing vessels and their attendant devices. Valves and adjustable apertures of all kinds are liable to obstruction and are not capable of instant effect in arresting the water-supply. In the construction shown this impediment is not present. The main tank 1 is, with the other parts shown, in a portable form, 2 being the gas-holding vessel, 3 the carbid-containing one set within the double-walled annular main tank 1, and 4 a water-supply vessel mounted on the gas-holding one.

6 is a pipe through which gas passes from the vessel 2 to the place of use, and 5 calcium carbid placed in the vessel 3, ready for use.

A bail 7 slides loosely in the lugs 8 on the tank or vessel 1 and serves to some extent as a guide for the movable vessels 2 and 4, also limits their range upward and in the case of portable apparatus and when the vessel 2 is empty or partially filled serves as a bail by means of which the whole is handled or moved.

The water-diffusing device 9 (shown in part at Fig. II) is formed of perforated tubular arms radiating from a common central discharge-pipe 13 and rests on the top of the carbid-containing vessel 3, as shown in Fig. I, and is provided with a hopper-like vessel 10, containing a sponge 12, so that water expressed from the sponge flows down the pipe 13 into the diffusing device 9, overflows at the orifices 14, and falls on the carbid 5.

When the vessels 2 and 4 descend by the escape of gas through the pipe 6, a perforated disk 15 on the stem 17 of the valve 18 enters the vessel 10, presses on the sponge 12, and expels water therefrom, which drains down through the pipe 13 and falls on the carbid 5. The sponge 12 is kept moist by water from tank 4 passing through valve 18 and perforations 19 of disk 15 whenever the valve 18 is opened by pressure of disk 15 upon sponge 12, as explained below. This at once evolves gas and the vessel 2 rises. The sponge 12 being released from pressure, the flow of water ceases, and all that is in the vicinity of the sponge 12 is absorbed or drawn back, arresting instantly the water-supply. When the supply of gas becomes sufficiently exhausted, the vessel 2 again descends by the weight of water in the vessel 4 until the upward pressure on the stem 14 raises the valve 18 and permits some water from the vessel 2 to escape into the disk 15, which, as seen in Fig. I, is made of a dished form and provided with perforations 19. The water thus supplied falls on and again saturates the sponge 12. The vessel 2 then rises, releasing the spring 12 and closing the valve 18, ready for another motion, as has been described.

The valve 18, when not raised by pressure of the disk 15 on the sponge 12, is held shut by a coiled spring 20, that is made of a strength or stiffness in proportion to the amount and weight of water in the vessel 4.

It will be seen that the amount of water in the vessel 4 determines the pressure on the gas contained in the vessel 2 and is consequently adjustable at will, also that all the water-ducts are free and large, with no risk of obstruction, as in the case of small apertures or regulating-cocks partially open. The sponge 12 can be substituted by any compressible and absorbent material, but a sponge is most suitable. The stops 22 and 23 are provided to determine the upward range of the disk and the valve 18.

Having thus explained the nature and objects of my invention, what I claim as new, and desire to secure by Letters Patent, is—

1. In an acetylene-generator, a carbid-containing vessel, movable superimposed gas-holding and water-containing vessels, water-passages from the latter to the carbid-containing vessel and a sponge or other absorbent body interposed in these water-passages which by pressure automatically applied thereon when the bell descends supplies water to the carbid and by release of pressure absorbs and arrests the water-supply, substantially as specified.

2. In an acetylene-generator, the tank vessel 1, movable gas-holding vessel 2, a water vessel mounted on the latter and a valve therein adapted to be raised and opened by the weight and downward movement of the gas-holding and water-containing vessels and in combination therewith the open vessel 10 and sponge 12 in the water-circuit whereby the supply of water is regulated and arrested, in the manner substantially as specified.

3. In an acetylene-generator, the annular tank vessel 1, movable gas-holding and water-containing vessels 2 and 4, valve in the water-containing vessel and means for automatically controlling the same by the rising and falling of the said vessels, carbid-containing vessel 3 and the radial water-diffusing devices 9 and 10, the latter resting loosely on the top of the carbid vessel 3, all combined and operating substantially as specified.

4. In an acetylene-generator, the annular tank vessel 1, the inverted gas-holding vessel 2 therein, the superimposed water-containing vessel 4 having in the bottom a valve with a downward-projecting stem, a coiled spring around the stem to hold the valve shut, a sponge 12, a water-diffusing device for holding the sponge and the disk 15 adapted to press upon and expel water from the sponge 12 and also open the valve, combined and operating substantially as specified.

In testimony whereof I have signed my name to this specification in the presence of two subscribing witnesses.

VICTOR T. WEATHERS.

Witnesses:
S. M. COCHRAN,
FRANK FREE.